Aug. 11, 1925.
L. T. PRICHARD
NAME PLATE
Filed Feb. 11, 1924
1,549,504
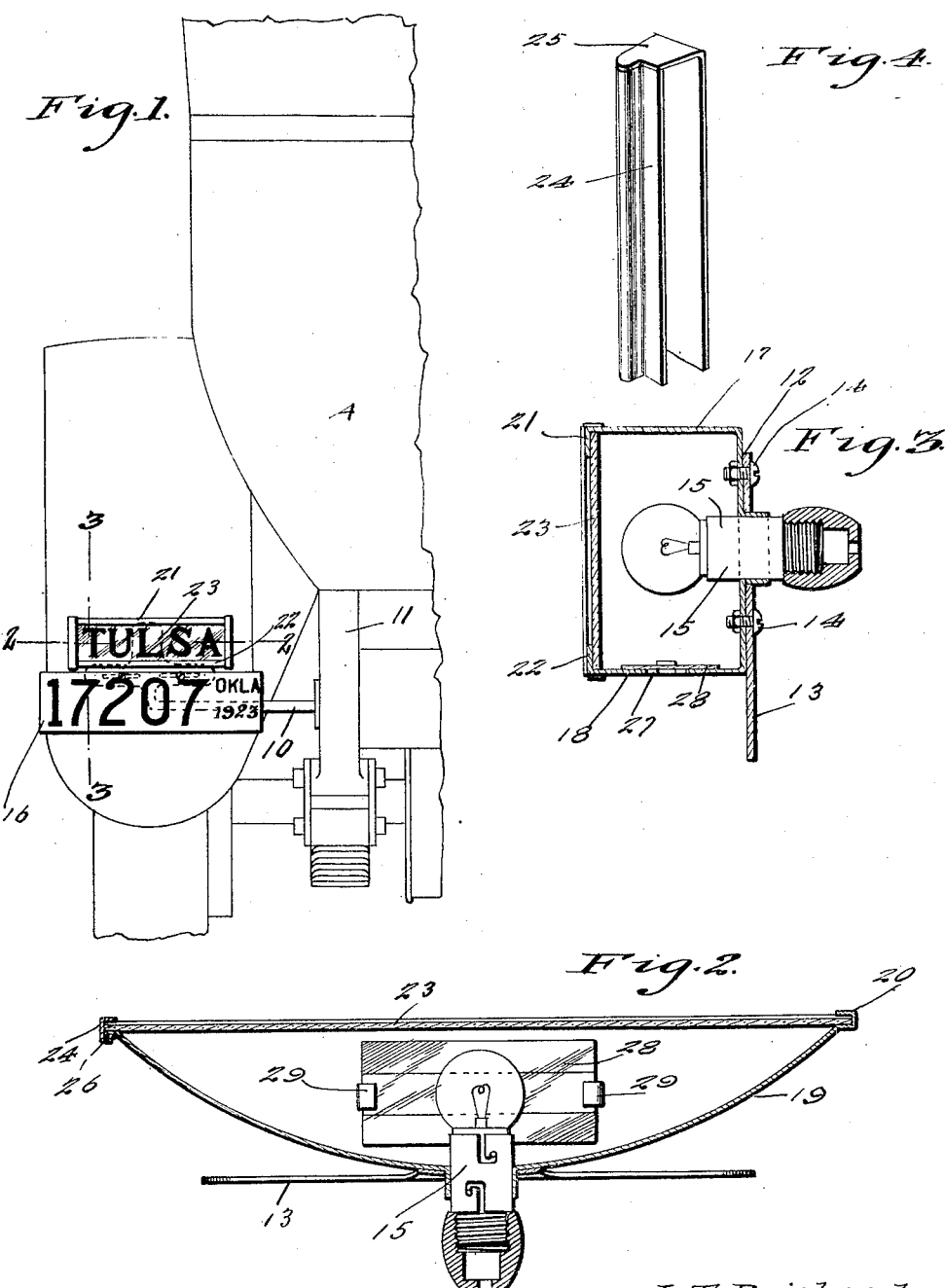

Patented Aug. 11, 1925.

1,549,504

UNITED STATES PATENT OFFICE.

LEVI THOMAS PRICHARD, OF TULSA, OKLAHOMA.

NAME PLATE.

Application filed February 11, 1924. Serial No. 692,181.

*To all whom it may concern:*

Be it known that I, LEVI T. PRICHARD, a citizen of the United States, residing at Tulsa, in the county of Tulsa and State of Oklahoma, have invented new and useful Improvements in Name Plates, of which the following is a specification.

It is the purpose of this invention to provide a combined tail light and illuminated name plate for motor operated vehicles which can be used in connection with the ordinary tail light bracket and supported directly above the license tag, the invention being very simple in construction, and capable of being manufactured and sold at a very nominal cost.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a fragmentary rear elevation of an automobile showing the invention applied thereto.

Figure 2 is a sectional view taken on the line 2—2 of Figure 1.

Figure 3 is a sectional view taken on the line 3—3 of Figure 2.

Figure 4 is a detail view of the resilient retaining element for holding the transparent panel in position.

Referring to the drawing in detail, A indicates generally a portion of a motor operated vehicle, upon which is mounted the rod 10 which projects from one side of the frame 11 and supports an inverted substantially T-shaped bracket plate, the stem of which is indicated at 12 and the head or cross piece at 13. The stem is also provided with openings to receive fastening elements 14 to secure the rear wall of the lamp casing thereto, while the stem is further provided with an enlarged opening to receive the electric light socket 15. This lamp casing is wholly supported by the stem 12 of the bracket plate, the head or cross piece 13 of said plate being arranged beneath the lamp casing and provided with longitudinal slots such as shown by dotted lines in Figure 1 to permit the license plate 16 to be secured thereto directly beneath the lamp casing.

As above stated, this lamp casing is adapted to be used in the capacity of a tail light, as well as to illuminate the name plate, having the name of the particular town or city in which the vehicle is licensed. Consequently the ordinary tail light can be removed from the vehicle and the lamp casing substituted and maintained upon the bracket in the manner shown. This lamp casing includes top and bottom walls 17 and 18 respectively which are connected by a curved rear wall 19, which wall is formed at one end to provide a substantially U-shaped portion 20 shown in Figure 2. The top and bottom walls terminate at their forward edges to provide flanges 21 and 22 respectively, and arranged behind these flanges and received by the U-shaped portion 20 is the transparent front wall or panel 23. This panel is slipped in position from one end of the lamp casing, and after being properly positioned it is held in place by means of a channel-shaped retaining element 24 of the construction shown in Figure 4, which element is open at one end and closed at its opposite end as at 25. The element 24 is slipped down over the ends of the flanges 21 and 22 above referred to and over the adjacent end of the rear wall 19, which end of the rear wall is offset as at 26 which has interlocking association with the element 24 to prevent casual separation of these parts. It will be noted upon inspection of Figure 1 that the transparent panel or front wall 23 is adapted to bear the name of the town or city in which the owner of the vehicle resides, and when the lamp casing is mounted upon the supporting bracket it is positioned directly above the license plate 16, so that the electric light bulb not only illuminates the transparent panel 23, but also illuminates the license tag 16. For this purpose, the bottom wall 18 of the lamp casing is provided with a longitudinal slot 26 which is covered by a transverse element 28. This element is preferably constructed of isinglass or the like and is held in position by means of resilient lugs 29 stamped from the bottom of the lamp casing and arranged to overlie the adjacent ends of the element 28.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A lamp casing including top and bottom walls, and a curved rear wall terminating at one end to provide a substantially U-shaped portion in cross section, a flange formed on the other end of the rear wall, flanges formed on the corresponding outer edges of the top and bottom walls and extended toward each other, a transparent panel insertable within the casing from one end thereof, and adapted to be arranged behind the flanges of said top and bottom wall, and received by the U-shaped portion of the rear wall, and a removable retaining element for said panel, said element being substantially U-shaped in cross section and adapted to be slipped downwardly over the other end of the rear wall and the ends of the flanges carried by the top and bottom walls, and a vertically disposed bulged portion formed on one of the sides of said retaining element and adapted to receive the flange carried by the rear wall, whereby said parts are interlocked.

In testimony whereof I affix my signature.

LEVI THOMAS PRICHARD.